United States Patent [19]

Morita et al.

[11] Patent Number: 4,788,878
[45] Date of Patent: Dec. 6, 1988

[54] RACK AND PINION STEERING GEAR

[75] Inventors: Kouji Morita, Fujisawa; Masahiro Aihara, Kamakura, both of Japan

[73] Assignee: Nissan Motor Company, Limited, Yokohama, Japan

[21] Appl. No.: 61,513

[22] Filed: Jun. 15, 1987

[30] Foreign Application Priority Data

Jun. 16, 1986 [JP] Japan ............................. 61-90521[U]

[51] Int. Cl.⁴ .............................................. B62D 3/12
[52] U.S. Cl. ...................................... 74/422; 74/409; 74/498
[58] Field of Search ......................... 74/422, 498, 409; 180/147, 148

[56] References Cited

U.S. PATENT DOCUMENTS 4,619,155 10/1986 Futaba .............................. 74/422 X

FOREIGN PATENT DOCUMENTS 58-142179 9/1983 Japan .
59-67162 4/1984 Japan ...................................... 74/422
59-133364 9/1984 Japan .
344316 3/1960 Switzerland ........................ 180/148

Primary Examiner—Allan D. Herrmann
Attorney, Agent, or Firm—Pennie & Edmonds

[57] ABSTRACT

A Belleville spring is interposed between adjacent end faces of a retainer and an adjuster for preventing a rattling sound of a steering gear. At least one of the end faces is conical in such a way as to taper in the same direction as the Belleville spring. The taper angle of the conical end face is smaller than that of the Belleville spring in a state free from any load. In one embodiment, a wave spring is used in place of the Belleville spring. In this case, at least one of the end faces is formed into a wave shape having a wave height smaller than that of the wave spring in a state free from any load.

12 Claims, 5 Drawing Sheets

RACK AND PINION STEERING GEAR

BACKGROUND OF THE INVENTION

1. Field of the Invention

The present invention relates to a rack and pinion steering gear for road vehicles.

2. Description of the Prior Art

A prior art rack and pinion steering gear, as exemplarily shown in FIG. 7, includes a pinion 1 adapted to be driven by a steering wheel and a rack 2 meshing the pinion 1 for movement in the longitudinal direction by being driven by the pinion 1. The rack 2 is connected at the opposite ends to dirigible wheels by way of a steering linkage so that longitudinal movement of the rack 2 causes rotation of the dirigible wheels.

In operation, the rack tends to flex or move away from the pinion 1 in transmission of steering efforts therebetween, thus reducing the contact ratio. In order to prevent such movement of the rack 2, a retainer 3 is provided for urging the rack 2 against the pinion 1 under the bias of a coil spring 4. The preload applied from the spring 4 to the rack 2 is adjusted to a suitable value through adjustment of the screwed amount of an adjuster 5.

In the above arrangement, the rack 2 is caused to vibrate in its longitudinal direction due to "kick back" of the dirigible wheels during movement of the vehicle over a rough road. This causes the rack 2 to flex away from the pinion 1 which is held stationary by the driver and allows the retainer 3 to strike against the adjuster 5 to produce a striking sound which is so-called a rattling sound.

In order to solve this problem, it has been proposed to interpose a resilient member (usually, Belleville spring) 6 between the adjacent end faces 3a, 5a of the retainer 3 and the adjuster 5, as disclosed in Japanese Utility Model Publication Nos. 59-133364 and 58-142179.

However, with the above arrangement, the resilient member (Belleville spring) 6 is pressed into a completely flat shape as shown in FIG. 8 when the retainer 3 comes nearest possible to the adjuster 5, thus subjecting the resilient member 6 to an excessively large load.

For this reason, in case of a vehicle of the kind frequently used for movement over a rough road, the durability of the resilient member 6 is a great problem. However, when the spring 4 is designed by giving the durability priority over the spring constant, the adjustable range of the preload becomes too narrow to obtain a desired performance of the steering gear or another problem arises that a rattling sound preventing action is not attained.

SUMMARY OF THE INVENTION

In accordance with the present invention, there is provided a novel and improved rack and pinion steering gear which comprises a pinion, a rack meshing with the pinion, a movable retainer disposed on the side of the rack opposite to the pinion to support thereon the rack, a stationary adjuster, a coil spring disposed between the retainer and the adjuster for urging the retainer against the rack, the adjuster being changeable in position for adjustment of a force which is generated by the spring and with which the rack is urged for contact with the pinion, and a resilient member interposed between the adjacent end faces of the retainer and the adjuster. The above structure may follow the conventional fashion.

In accordance with the present invention, at least one of the adjacent end faces being so shaped as to allow the resilient member to remain in a condition capable of being compressed further even when the retainer comes nearest possible to the adjuster.

In one embodiment, the resilient member is a Belleville spring tapered toward the adjuster, with the end face of the retainer being conical in such a way as to taper in the same direction as the Belleville spring, i.e., toward the adjuster. The conical end face of the retainer is larger in taper angle than the belleville spring in a state free from any load.

The above structure is quite effective for overcoming the above noted disadvantages and shortcomings inherent in the prior art device.

It is accordingly an object of the present invention to provide a novel and improved rack and pinion steering gear which can improve the durability of a resilient member provided for preventing a rattling sound of the steering gear.

It is another object of the present invention to provide a novel and improved rack and pinion steering gear of the above described character which can assuredly prevent the rattling sound for a prolonged period of usage even when it is installed in a vehicle of the kind frequently used for movement over a rough road.

It is a further object of the present invention to provide a novel and improved rack and pinion steering gear of the above described character which can attain a wide range of adjustment of a preload to be given to a rack.

It is a further object of the present invention to provide a novel and improved rack and pinion steering gear which makes it possible to reduce the design restrictions of the resilient member, i.e., makes it possible to design the resilient member freely without the necessity of giving the durability priority over the spring constant.

DESCRIPTION OF THE PREFERRED EMBODIMENTS

Figure 1:
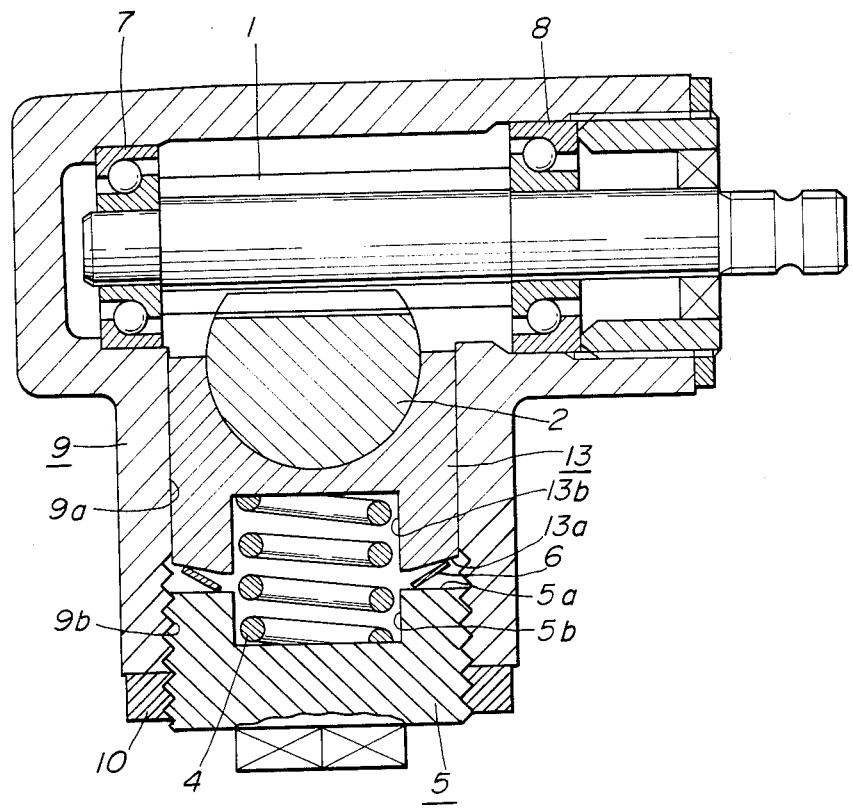
FIG. 1 is a sectional view of a rack and pinion steering gear according to an embodiment of the present invention.
Figure 8:
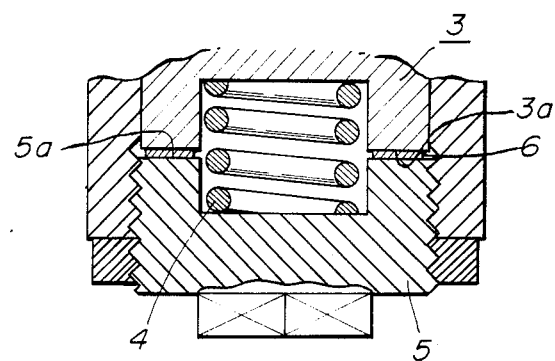
FIG. 8 is a fragmentary sectional view of the prior art rack and pinion steering gear of FIG. 7 in an operative condition in which a retainer is positioned nearest possible to an adjuster.
Figure 7:
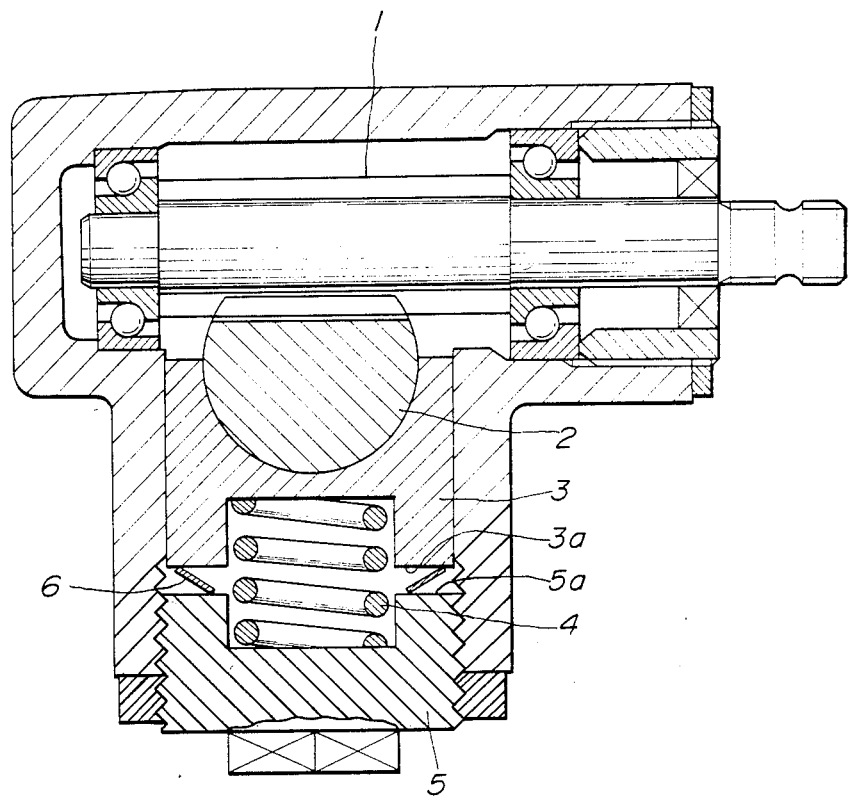
FIG. 7 is a sectional view of a prior art rack and pinion gear.

Referring to FIG. 1, in which elements or parts indentical with those of the prior art steering gear of FIGS. 7 and 8 are designated by the same reference characters, a rack and pinion steering gear is shown as including a pinion 1 which is rotatably supported by a pair of bearings 7, 8 on a housing or gear box 9 and adapted to project at an end thereof outwardly from the gear box 9 for connection with an unshown steering wheel. A rack 2 meshing the pinion 1 is slidable relative to the gear box 9 and extends through same to have opposite ends projecting outwardly from the gear box 9 and connected, though not shown, to dirigible wheels by way of a steering linkage.

A cylindrical retainer 13 is disposed on the side of the rack 2 opposite to the pinion 1 to hold or support the rack 2 at one axial end thereof and is installed in a bore 9a of the gear box 9 in such a way as to be axially slidable toward and away from the rack 2. The bore 9a of the gear box 9 has a threaded end 9b through which the retainer 13 is inserted into the gear 9 box and into which a cylindrical adjuster 5 is screwed. A coil spring 4 is disposed between the retainer 13 and the adjuster 5 and exerts a spring force that is adjusted to a desired value through adjustment of the screwed amount of the adjuster 5. More specifically, the retainer 13 and the adjuster 5 are respectively and concentrically formed with, at the adjacent ends, recesses 13b, 5b of a circular cross section for receiving therein the opposite ends of the spring 4. After the adjustment of the spring force, the adjuster 5 is locked by means of a lock nut 10.

The retainer 13 and the adjuster 5 have annular adjacent end faces 13a, 5a around the recesses 13b, 5b and between which end faces 13a, 5a resilient member 6 is disposed. The resilient member 6 is, in this embodiment, a Belleville spring and disposed so as to taper toward the adjuster 5, i.e., so as to have a smaller diameter end in contact with the annular end face 5a of the adjuster 5 and a larger diameter end in contact with the annular end face 13a of the retainer 13. The annular end face 13a of the retainer 13 is conical or truncated cone-shaped in such a way as to taper toward the adjuster 5, i.e., in such a way as to become smaller in diameter as it becomes nearer to the adjuster 5. In this connection, the annular end face 13a of the retainer 13 is not necessarily conical in its entirety but can be partially conical, i.e., only a portion can be conical that is wide enough to include therewithin the projected figure of the resilient member 6 when the resilient member 6 is projected on the annular end face 13a. The conical end face 13a of the retainer 13 is adapted to taper in the same direction as the Belleville spring 6 in a state free from any load. The annular end face 5a of the adjuster 5 is not tapered or conical but planar.

In operation, a steering effort (rotation) is transferred through the steering wheel to the pinion 1, and rotation of the pinion 1 is converted into a longitudinal movement of the rack 2 which in turn causes the dirigible wheels to be turned in the direction corresponding to the steered direction of the steering wheel. During movement of the vehicle over a smooth surface road, the rack 2 is not caused to move away from the pinion 1 since the rack 2 is applied with a suitable preload and thereby urged against the pinion 1 by way of the retainer 13, thus making it possible to maintain a high contact ratio.

Figure 2:
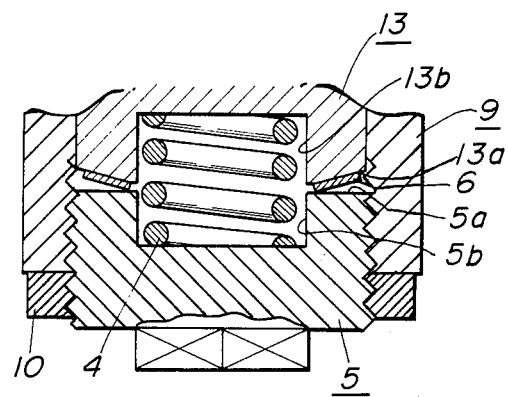
FIG. 2 is a view of the rack and opinion steering gear of FIG. 1 in an operative condition in which a retainer is positioned nearest possible to an adjuster.
Figure 3:
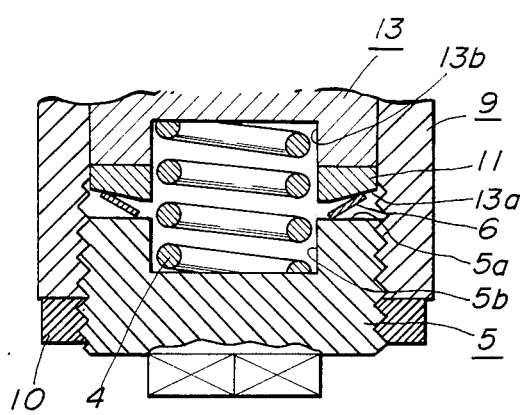
FIGS. 3 to 6c views similar to FIG. 2 but showing modifications of the present invention.

During movement of the vehicle over a rough road, the rack 2 flexes or moves away from the pinion 1 against the bias of the spring 4 and the resilient member 6. However, this does not cause the rattling sound since the retainer 13 is prevented from striking against the adjuster 5 by the effect of the buffer action of the resilient member 6. In this connection, even when the retainer 13 comes nearest possible to the adjuster 5 as shown in FIG. 2, the resilient member 6 still remains in a condition capable of being squeezed or compressed further and therefore assuredly prevented from being pressed into a completely flat shape. Accordingly, the resilient member 6 is assuredly prevented from being subjected to an excessively large load and therefore free from the above noted problem of the deteriorated durability. For this reason, it becomes unnecessary, in design of the spring 6, to give the durability priority over the spring constant, thus making it possible to attain a wide range of adjustment of the preload and therefore making it possible to attain a desired performance of the steering gear including the rattling sound preventing action.

In the meantime, when there is a possibility that the resilient member 6 bites or cuts into the retainer 13, a washer or seating 11 made of a material harder than the retainer proper 13 can be used to constitute the conical end face 13a of the retainer 13 to produce the same effect as mentioned above.

Figure 4:
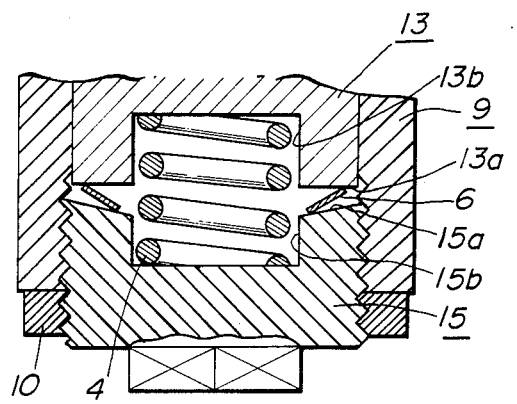
Figure 5A:
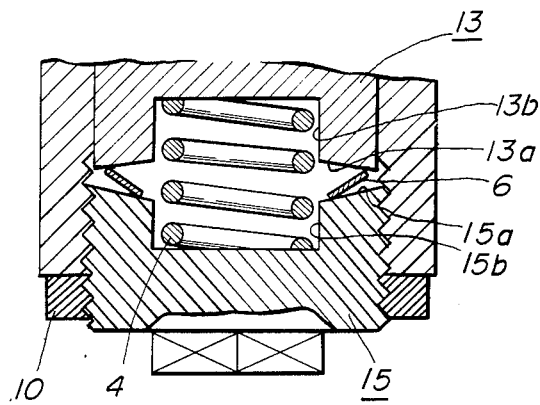
Figure 5B:
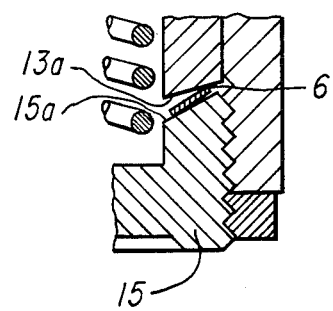

While the end face 13a of the retainer 13 is formed into a conical shape in the above two embodiments, the end face 15a of the adjuster 15 may instead be conical or tapered in the same direction as shown in FIG. 4. This enables the resilient member 6 to produce the same effect as mentioned above. Further, both of the end faces 13a, 15a of the retainer 13 and the adjuster 15 can be conical in such a way as to taper in the opposite directions as shown in the solid lines in FIG. 5A or in the same direction but at different taper angles as shown FIG. 5B.

Figure 6A:
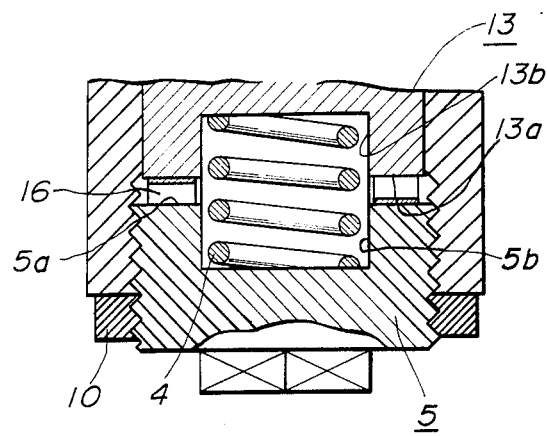
Figure 6B:
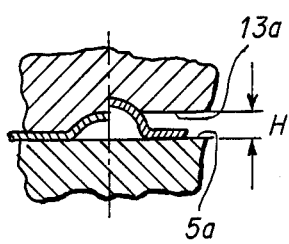
Figure 6C:
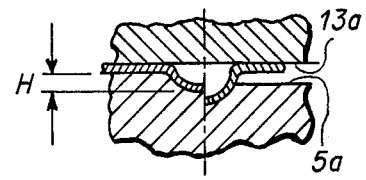

In the foregoing, while the resilient member 6 has been described and shown as being a Belleville spring, it may otherwise be an annular wave spring 16 similar in shape to a wave washer as shown in FIG. 6A. In this instance, at least one of the end faces 13a, 5a is formed into a wave shape as shown in FIGS. 6B and 6C, instead of being tapered, in such a way that the wave height "H" is smaller than that of the wave spring 16 in a state free from any load.

What is claimed is:

1. A rack and pinion steering gear comprising:
    a pinion;
    a rack meshing said pinion;
    a movable retainer disposed on the side of said rack opposite to said pinion to support thereon said rack;
    a stationary adjuster;
    a coil spring disposed between said retainer and said adjuster for urging said retainer against said rack;
    said adjuster being changeable in position for adjustment of a force which is generated by said spring and with which said rack is urged for contact with said pinion;
    said retainer and said adjuster having adjacent end faces; and
    a resilient member interposed between said adjacent end faces of said retainer and said adjuster;
    at least one of said adjacent end faces being so shaped as to allow said resilient member of itself to retain the ability of being compressed further even when said retainer comes nearest possible to said adjuster.

2. A rack and pinion steering gear comprising:
    a pinion;
    a rack meshing said pinion;
    a housing receiving therein said pinion and said rack;
    a retainer slidably installed in said housing and disposed on the side of said rack opposite to said pinion to support thereon said rack;
    an adjuster installed stationarily in said housing;
    a coil spring disposed between said retainer and said adjuster for urging said retainer against said rack;

said adjuster being changeable in position for adjustment of a force which is generated by said spring and with which said rack is urged for contact with said rack;

said retainer and said adjuster having adjacent end faces; and a resilient member interposed between said adjacent end faces of said retainer and said adjuster;

at least one of said adjacent end faces being so shaped as to allow said resilient member of itself to retain the ability of being compressed further even when said retainer comes nearest possible to said adjuster.

3. A rack and pinion steering gear as set forth in claim 2 wherein said housing is formed with a bore having a threaded end, said retainer being cylindrical and disposed in said bore whilst said adjuster being cylindrical and screwed into said threaded end.

4. A rack and pinion steering gear as set forth in claim 3 wherein said retainer and said adjuster are respectively and concentrically formed with, at adjacent ends thereof, recesses of a circular cross section, said spring having opposite ends received in said recesses, said end faces being annular and provided around said recesses.

5. A rack and pinion steering gear as set forth in claim 4 wherein said resilient member is a belleville spring, and said one end face is conical in such a way as to taper in the same direction as said belleville spring.

6. A rack and pinion steering gear as set forth in claim 5 wherein said conical end face is larger in taper angle than said belleville spring.

7. A rack and pinion steering gear as set forth in claim 6 wherein said one end face is said end face of said retainer.

8. A rack and pinion steering gear as set forth in claim 7 wherein said one end face is said end face of said adjuster.

9. A rack and pinion steering gear as set forth in claim 7 wherein said end face of said retainer is constituted by a seating made of a material harder than said retainer.

10. A rack and pinion steering gear as set forth in claim 4 wherein said resilient member is a belleville spring, and both of said end faces of said retainer and said adjuster are conical in such a way as to taper in the opposite directions.

11. A rack and pinion steering gear as set forth in claim 4 wherein said resilient member is a belleville spring, and both of said end faces of said retainer and said adjuster are conical in such a way as to taper in the same direction as said belleville spring and at different taper angles.

12. A rack and pinion steering gear as set forth in claim 4 wherein said resilient member is a wave spring, and said one end face is formed into a wave shape having a wave height smaller than that of said wave spring.

* * * * *